US005346175A

United States Patent [19]

Hunnicutt

[11] Patent Number: 5,346,175
[45] Date of Patent: Sep. 13, 1994

[54] VARIABLE ASSIST STEERING CONTROL VALVE

[75] Inventor: Harry A. Hunnicutt, Ann Arbor, Mich.

[73] Assignee: Kelsey-Hayes Company, Romulus, Mich.

[21] Appl. No.: 999,425

[22] Filed: Dec. 31, 1992

[51] Int. Cl.⁵ .............................................. B62D 5/06
[52] U.S. Cl. ................................. 251/129.08; 137/529; 180/142
[58] Field of Search ...................... 137/529; 180/142; 251/129.08

[56] References Cited

U.S. PATENT DOCUMENTS

| 3,022,772 | 2/1962 | Zeigler et al. | |
|---|---|---|---|
| 3,791,408 | 2/1974 | Saitou et al. | 137/529 |
| 3,908,779 | 9/1975 | Inoue. | |
| 4,561,516 | 12/1985 | Bishop et al. | |
| 4,623,118 | 11/1986 | Kumar. | |
| 4,672,885 | 6/1987 | Kervagoret | 180/142 X |
| 4,702,335 | 10/1987 | Cage et al. | |
| 4,712,631 | 12/1987 | Kervagoret. | |
| 4,712,632 | 12/1987 | Kervagoret. | |
| 4,763,745 | 8/1988 | Eto et al. | 180/143 |
| 4,819,545 | 4/1989 | Dymond. | |
| 4,830,131 | 5/1989 | Miyoshi et al. | |
| 4,858,713 | 8/1989 | Kawakami et al. | |
| 4,877,099 | 10/1989 | Duffy. | |
| 5,122,958 | 6/1992 | Eto et al. | 180/142 X |

Primary Examiner—Robert G. Nilson
Attorney, Agent, or Firm—MacMillan, Sobanski & Todd

[57] ABSTRACT

A control valve responsive to vehicle speed to vary hydraulic pressure in a vehicle variable assist power steering system. The control valve includes a proportional solenoid which responds to a control signal to vary the pressure difference between the valve inlet and outlet. The flow of hydraulic fluid through the valve generates a momentum force against a solenoid moveable valve element. This momentum force is balanced by an opposing bias spring force such that changes in inlet pressure occur simultaneously with changes in the control signal. The solenoid includes an adjustable air gap which allows calibration of the pressure difference across the valve to match a predetermined solenoid current.

6 Claims, 3 Drawing Sheets

VARIABLE ASSIST STEERING CONTROL VALVE

BACKGROUND OF THE INVENTION

This invention relates in general to vehicle variable assist power steering systems and in particular to a valve for varying the amount of assistance provided by the system in response to a sensed vehicle operating parameter such as vehicle speed.

Power steering systems are included in many vehicles to reduce the effort required by the operator to steer the vehicle. Conventional hydraulic power steering systems include a hydraulic actuator for moving a vehicle steering linkage. The hydraulic actuator is controlled by a rotary control valve assembly which is connected to the vehicle steering wheel. The system provides steering assistance in proportion to steering torque exerted by the operator upon the steering wheel. For any given amount of applied steering torque, the same amount of steering assistance will be provided. However, the amount of assistance needed for low speed maneuvers, such as parking, is not desirable at high speeds, where the assistance detracts from the driver's feel of the road. Thus, it is desirable to vary the amount of steering assist as the vehicle speed varies.

One example of a variable assist power steering system is disclosed in U.S. Pat. No. 4,702,335 issued to Cage et al. In this patent, the supply of hydraulic fluid to the rotary control valve assembly is restricted as vehicle speed increases. The supply is restricted by a flow control valve operated by a stepper motor.

Another example of a variable assist power steering system is described in U.S. Pat. No. 4,561,516 issued to Bishop. The system of this patent is schematically illustrated in prior art FIG. 1. As shown in FIG. 1, the power steering system 10 includes a pump 11 supplying hydraulic fluid through a constant flow valve 12 to a rotary control valve assembly 13. The constant flow valve 12 maintains a constant flow rate for the hydraulic fluid from the pump 11. The control valve assembly 13 supplies fluid to a hydraulic actuator 14 in relation to torque applied to the valve by the vehicle operator. The hydraulic actuator 14 is coupled to a vehicle steering linkage (not shown) and is operable to move the linkage. Fluid is discharged from the rotary valve 13 through a discharge line 15 to a reservoir 16. The hydraulic fluid is drawn from the reservoir 16 through a recirculation line (not shown) to the pump 11.

The power steering system 10 further includes an electronic control module 17 which is responsive to a vehicle speed sensor 18. The control module 17 causes a flapper valve 19 to restrict the flow of fluid through the discharge line 15. Restriction of the fluid flow changes the hydraulic pressure within the rotary control valve assembly 13. In the Bishop patent, changing the hydraulic pressure shifts a component within the rotary valve assembly (not shown) to alter the degree of steering assistance provided to the operator. This relationship is illustrated in FIG. 1 by a block 20 labeled "AXIAL SHIFT" which is connected by dashed lines to the valve 19 and the rotary control valve assembly 13.

A sectional view of the flapper valve 19 is shown in prior art FIG. 2. The valve includes an inlet 21 and an outlet 22. The inlet 21 is connected to the outlet 22 by a chamber 23. A valve element 24 is disposed within the chamber 23 and cooperates with a valve seat 25 to control the flow of fluid through the valve 19. The valve further includes a solenoid coil 26 which urges the valve element 24 towards the valve seat 25 when the coil 26 is energized by an electric current.

During operation of the power steering system 10, a momentum force generated by the flow of hydraulic fluid through the flapper valve 19 urges the valve element 24 to a fully open position. The valve 19 is progressively closed by supplying an increasing electric current to the solenoid coil 26 as vehicle speed changes. As the valve 19 is closed, the flow of hydraulic fluid through the discharge line 15 is restricted, increasing the hydraulic pressure within the rotary control valve assembly 13 and shifting the component. However, the flapper valve 19 includes a response lag between the initial movement of the valve element 24 and a change in vehicle speed. This is because a current must be supplied to the solenoid coil 26 of sufficient magnitude to overcome the fluid momentum force before the valve begins to close.

SUMMARY OF THE INVENTION

This invention relates to an improved pressure control valve which is preferably used in a power steering system and is responsive to vehicle speed to vary the amount of steering assist provided to the operator. The valve has a construction which can provide pressure control immediately upon application of an analog current above a zero current level, and thus is not subject to a response lag.

The control valve includes a housing having an inlet for receiving hydraulic fluid and an outlet for discharging the fluid. The housing also has a fluid carrying passageway connecting the inlet and outlet. A movable valve element is disposed within the passageway and operable for controlling the fluid pressure difference between the inlet and the outlet within a predetermined pressure range. The valve element is subject to a momentum force caused by fluid flow through the passageway.

The valve further includes a solenoid carried by the housing which has an armature connected to and movable with the valve element. The solenoid is responsive to an electric control signal for exerting a magnetic force on the armature for positioning the valve element within the passageway. The positioning of the valve element achieves a selected fluid pressure difference between the valve inlet and outlet. The control signal is variable between predetermined minimum and maximum levels.

The valve also has a biasing means for exerting a balancing force on the valve element in opposition to the momentum force. The balancing force is such that an initial increase in the control signal above the minimum level causes an increase in fluid pressure difference between the valve inlet and outlet. Thus, the valve is not subject to a response lag and can be effectively used with analog control signals.

The valve further includes an adjustable air gap between the solenoid armature and a fixed core piece. The adjustable air gap allows calibration of the valve to produce a predetermined pressure difference across the valve for a predetermined solenoid current. The calibration provides compensation for manufacturing tolerances.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
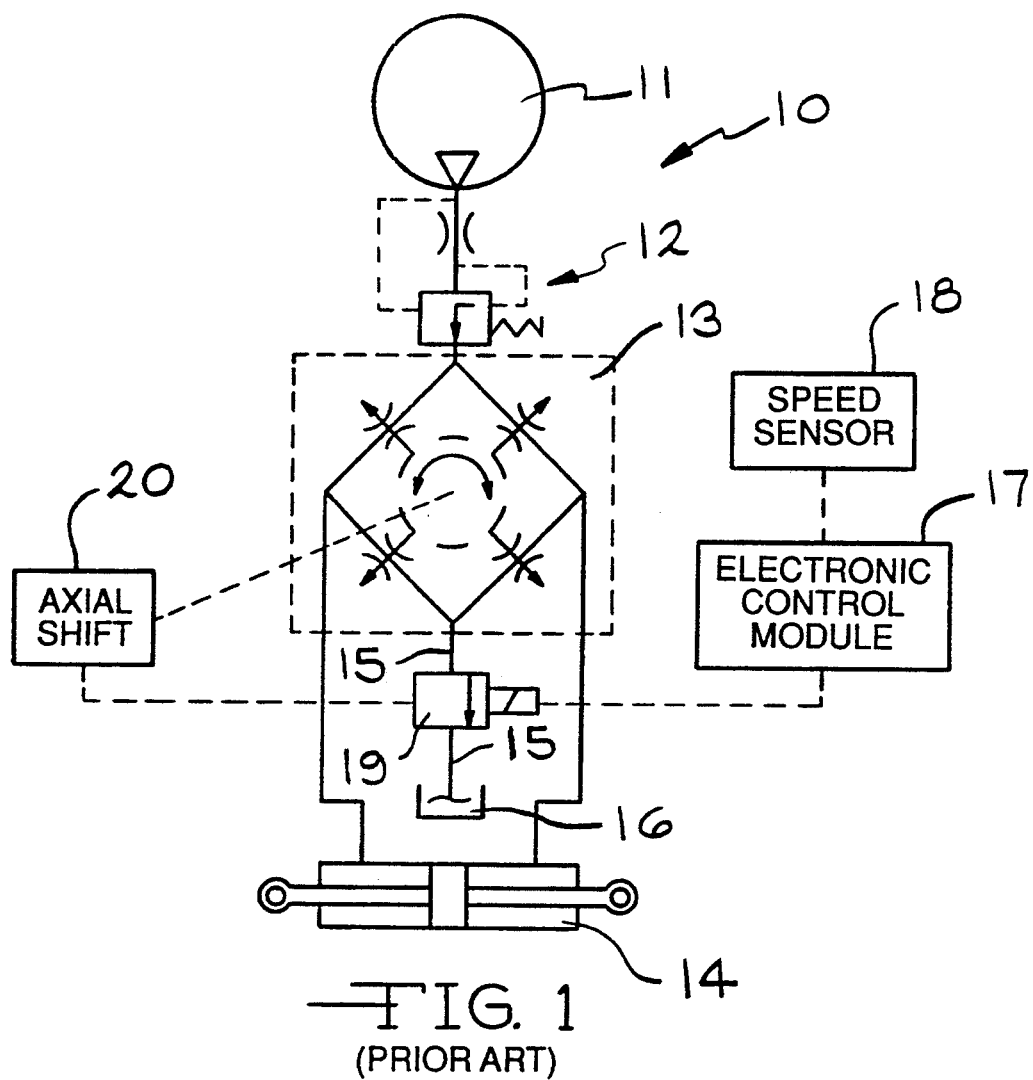
FIG. 1 is a schematic diagram of a prior art variable assist power steering system.
Figure 2:
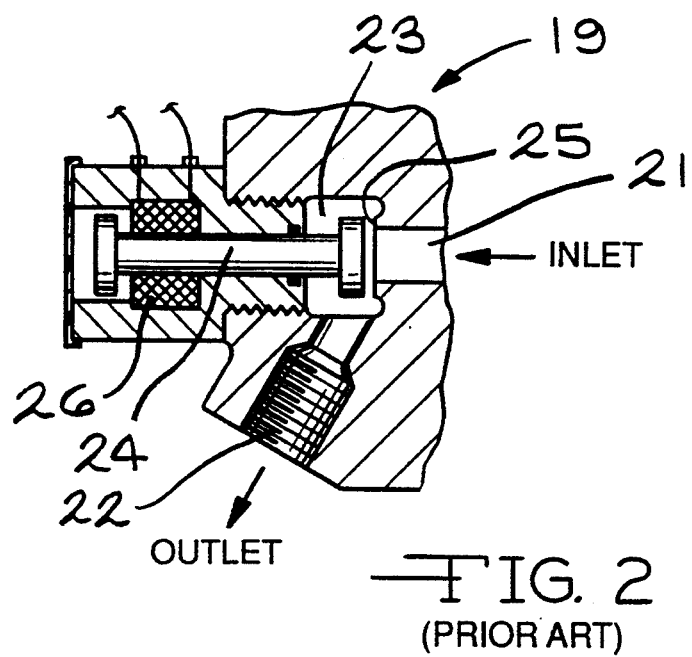
FIG. 2 is a sectional view of a flapper valve included in the prior art system shown in FIG. 1.
Figure 3:
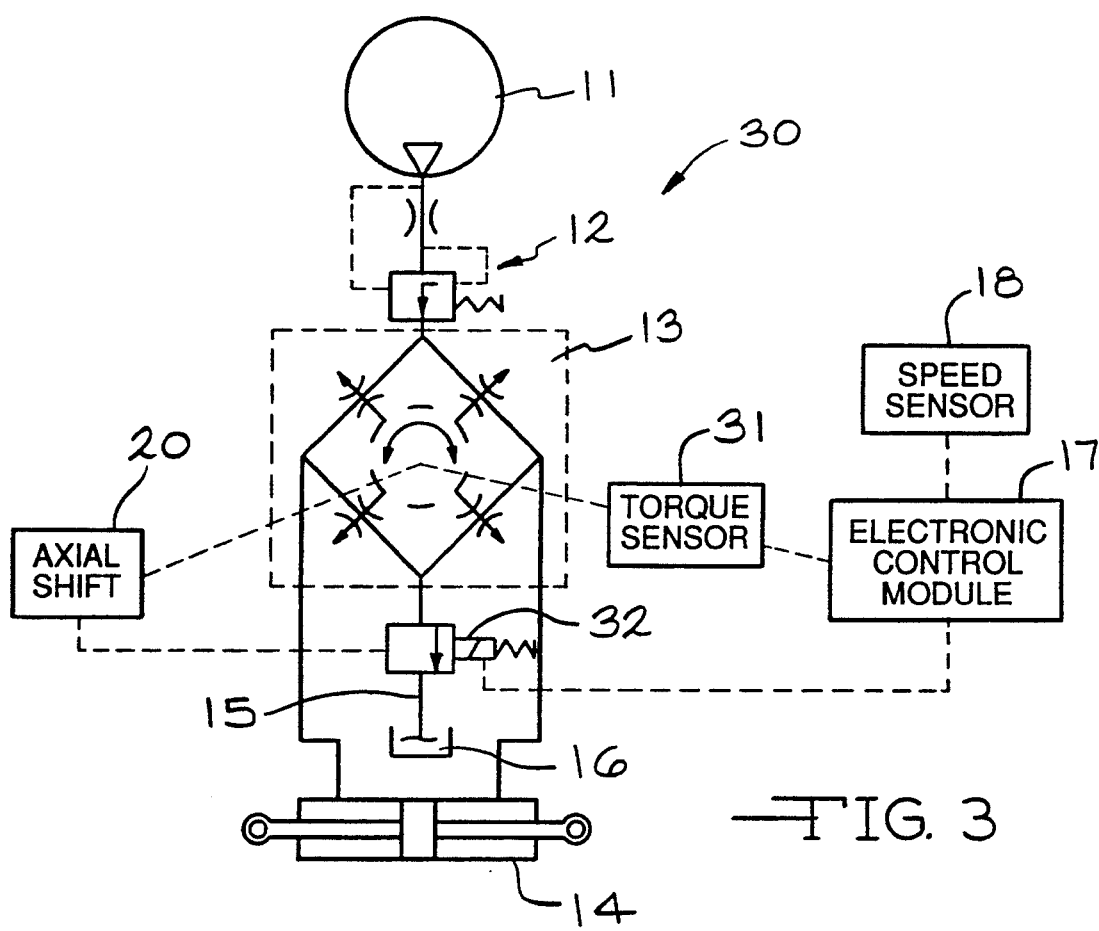
FIG. 3 is a schematic diagram of a variable assist power steering system in accordance with the present invention.

Referring now to the drawings, there is illustrated in FIG. 3 a variable assist power steering system 30 in accordance with this invention. The majority of components in FIG. 3 are similar to those used in the prior art system 10 of FIG. 1 and are accordingly numbered the same. As illustrated in FIG. 3, the system 30 also may include a torque sensor 31 to detect sudden turns at highway speeds. Other input sensors may be added to the system 30.

Figure 4:
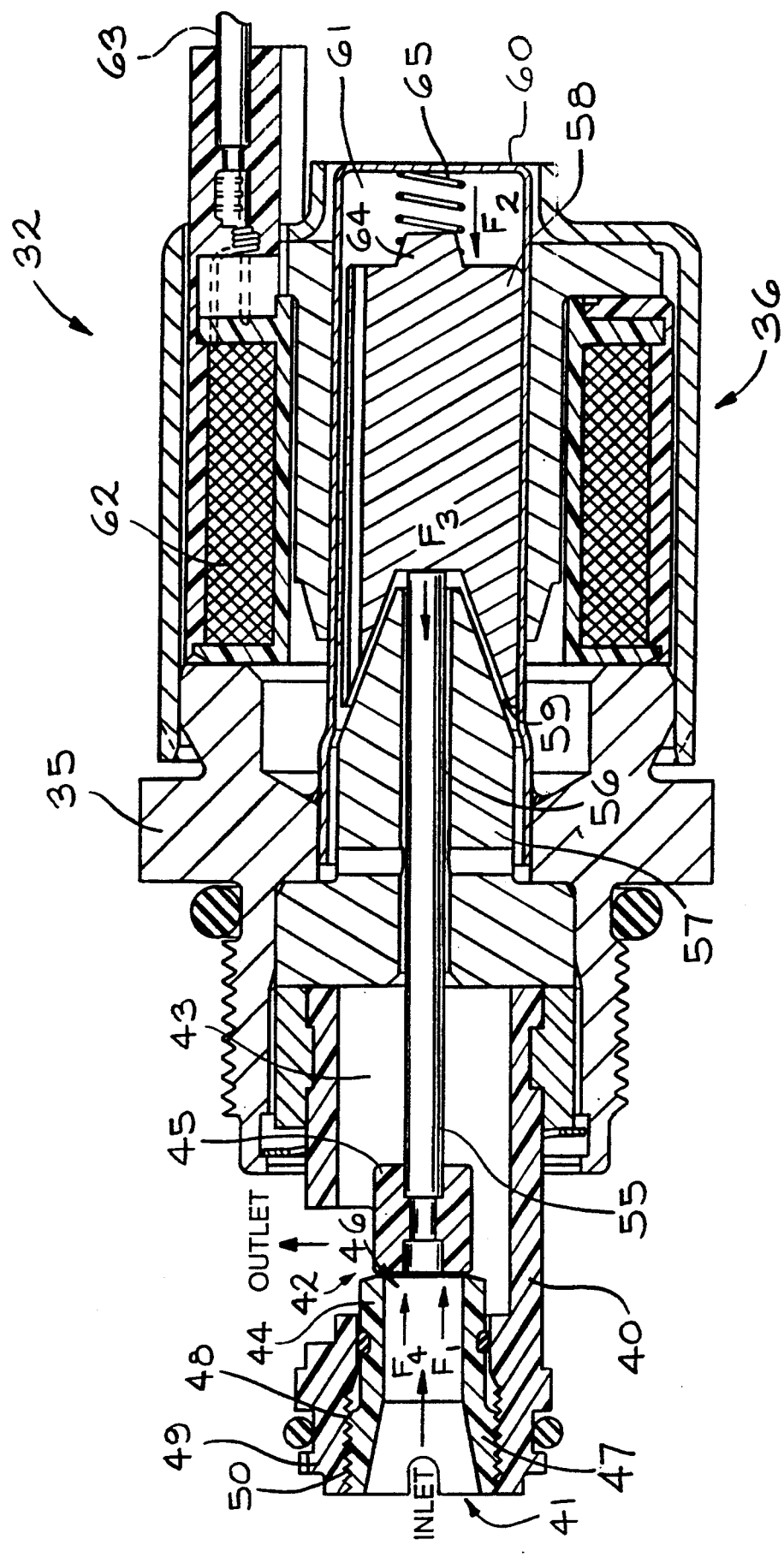
FIG. 4 is a sectional view of a pressure control valve included in the system shown in FIG. 3.

The primary change from the prior art system 10 is the inclusion of an improved solenoid operated control valve 32 for controlling hydraulic pressure in the discharge line 15. As shown in FIG. 4, the valve 32 has a casing 35 which carries a proportional solenoid 36 and a valve housing 40. The valve housing 40 includes an inlet 41 adapted to receive a flow of hydraulic fluid and an outlet 42 adapted to discharge the flow. While the inlet 41 and outlet 42 are oriented perpendicular to each other in FIG. 4, other configurations are possible. The inlet 41 is connected to the outlet 42 by an axial passageway 43 through the valve housing 40. The passageway 43 carries the fluid between the inlet 41 and the outlet 42. A valve base 44 and valve element 45 are disposed within the passageway 43 between the inlet 41 and the outlet 42. The valve element 45 is axially movable towards and away from the valve base 44. The valve base 44 includes an orifice 46 formed therethrough. During operation of the power steering system 30, hydraulic fluid flows through the orifice 46 in the valve base 44 and against the valve element 45.

The valve base 44 includes an end portion 47 adjacent to the inlet 41 which has threads 48 formed on the exterior thereof. Similarly, the valve housing 40 has an end portion 49 having threads 50 formed on the interior thereof. The valve base threads 48 cooperate with the valve housing threads 50 for adjustment of the axial position of the valve base 44 within the valve housing 40.

The valve element 45 is mounted on one end of a valve actuator rod 55. The other end of the actuator rod 55 passes through a bore 56 formed through a fixed iron solenoid core 57 to engage an armature 58 of the solenoid 36. The armature 58 is axially spaced apart from the iron core 57 to form a solenoid gap 59. The armature 58 is sealingly enclosed by an armature cover 60 which forms an armature chamber 61. The armature cover 60 is surrounded by a solenoid coil or winding 62 which is energized by an electrical current passing through wire leads 63. When the coil 62 is initially energized, the armature 58 is displaced axially towards the valve base 44. The solenoid 36 is designed such that the armature displacement is proportional to the magnitude of the current supplied to the winding 62.

A boss 64 is formed on the end of the armature 58 opposite from the actuator rod 55. One end of a bias spring 65 which has a very low spring rate is disposed about the boss 64. The other end of the spring 65 engages the inside surface of the end of the armature cover 60.

The diameter of the actuator rod 55 is sized smaller than the bore 56 through the iron core 57 to allow hydraulic fluid to enter the armature chamber 61. Similarly, the armature 58 is sized to allow the hydraulic fluid to fill the entire armature chamber 61, including the portion between the armature and cover ends. Thus, any armature movement is hydraulically damped by the fluid.

The operation of the control valve 32 will now be described. A constant flow of hydraulic fluid supplied by the pump 11 passes through the rotary control valve assembly 13 and enters the inlet 41 of the pressure control valve 32. The fluid flow passes through the valve base orifice 46 and the passageway 43 and is discharged through the outlet 42. The control valve 32 restricts the fluid flow causing a pressure difference to be developed between the inlet 41 and the outlet 42. The valve pressure difference is a function of the size of the valve base orifice 46 and has a typical value of 5 PSI.

The hydraulic fluid flow must change direction to be discharged through the outlet 42. In changing direction, the flow develops a momentum force, shown as an arrow $F_1$ in FIG. 4, which is exerted against the valve element 45. The momentum force $F_1$ axially shifts the valve element 45 away from the valve base 44. The axial movement of the valve element 45 is transmitted by the actuator rod 55 to the solenoid armature 58 and the bias spring 65. Because the bias spring 65 has a very low spring rate, the spring 65 compresses slightly as the armature 58 shifts to the right in FIG. 4. Typical armature movement due to the momentum force is on the order of 0.060 to 0.070 inches. Compression of the spring 65 causes the spring to exert a force countering the momentum force $F_1$. The spring force, shown as a second arrow $F_2$ in FIG. 4, acts towards the valve base 44. The spring force $F_2$ exactly balances the momentum force $F_1$ developed by the fluid changing direction.

In response to vehicle speed, the electronic control module 17 generates an electric control signal which varies between predetermined minimum and maximum values. For the present embodiment, the minimum control signal is zero, however, other minimum values may be used. The control signal causes an electric current which varies between minimum and maximum values that correspond to the control signal values to flow through the lead wires 63 and the solenoid coil 62. Similar to the control signal, the preferred embodiment has a zero minimum current, however, other minimum currents may be used. When current is supplied to the solenoid coil 62, a magnetic force is developed to urge the armature 58 towards the valve base 44, as shown by a third arrow $F_3$ in FIG. 4. Because the momentum force $F_1$ and the spring force $F_2$ are exactly balanced, the magnetic force $F_3$ will cause the armature to begin to shift to the left in FIG. 4 simultaneously with an initial increase in the control signal. As the armature shifts towards the left, the valve element 45 is urged by the actuator rod 55 towards the valve base 44. Because, the fluid flow through the valve 32 is maintained at a constant flow rate, the valve element movement causes the pressure difference between the inlet 41 and the outlet 42 to increase. This pressure increase exerts a reaction force, shown as $F_4$ in FIG. 4, upon the face of the valve element 45. The reaction force $F_4$ balances the magnetic force $F_3$ exerted by the solenoid 36.

As described above, the armature 58 shifts a distance proportional to the magnitude of the applied current. If the solenoid current is increased, the magnetic force $F_3$ also increases, shifting the armature 58 and the valve element 45 further towards the valve base 44. As the valve element 45 shifts towards the valve base 44, the pressure difference across the valve increases which increases the reaction force $F_4$ balancing the magnetic force $F_3$. Similarly, when the solenoid current is decreased, the solenoid magnetic force $F_3$ will decrease. The result will be a net force acting to the right in FIG. 4. This net force acts to shift the valve element 45 and armature 58 to the right in FIG. 4 to reestablish a balance of forces within the valve 32. As the valve element 45 shifts to the right in FIG. 4, the pressure difference across the valve decreases. Thus, the hydraulic pressure difference developed between the inlet 41 and the outlet 42 varies proportionally to the applied current. Further, the control valve 32 produces a minimum pressure difference corresponding to the minimum coil current and a maximum pressure difference corresponding to the maximum coil current. Hence, the control valve 32 is operable within a predetermined range of pressure differences. Likewise, if the outlet 42 is maintained at atmospheric pressure, the valve 32 is operable to control fluid pressure at the inlet 41 within a predetermined range.

Figure 5:
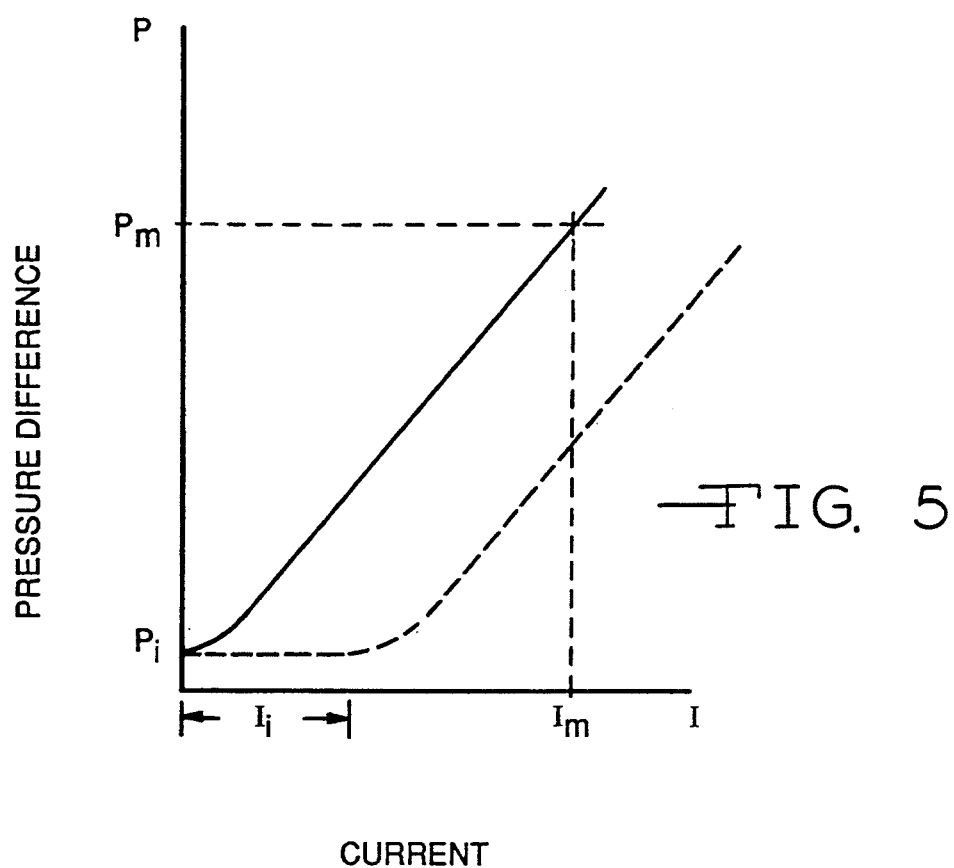
FIG. 5 is a response curve for the control valve shown in FIG. 4.

The relationship between the applied current, I, and the pressure difference, P, for the control valve 32 is illustrated by a solid valve response curve in FIG. 5. In FIG. 5, the horizontal axis labeled "I" represents the current applied to the solenoid coil 62 in response to the control signal. Likewise, the vertical axis labeled "P" represents the pressure difference between the valve inlet 41 and the valve outlet 42. The solid valve response curve intersects the inlet pressure axis P at an initial pressure difference, $P_i$, which, as explained above, is determined by the size of the valve base orifice 46. The control valve 32 develops a maximum pressure difference, $P_M$, for a maximum applied current, $I_M$. A typical maximum pressure difference is 75 PSI, which corresponds to a typical maximum current of one amp and a nominal armature displacement due to magnetic force $F_3$ of 0.050 to 0.060 inches. As the valve pressure difference increases, the hydraulic pressure in the discharge line 15 upstream of the valve 32 is raised. The increased hydraulic pressure acts upon the rotary control valve assembly 13 in a known manner to vary the amount of power steering assist provided to the vehicle operator.

The response of the present invention differs from the response provided by prior art flapper valves. Prior art flapper valves do not include a bias spring 65 to develop a balancing spring force $F_2$. Because of this, the solenoid in a flapper valve must first develop a sufficient initial magnetic force $F_3$ to overcome the fluid momentum force $F_1$ before the armature will begin to move. Thus, prior art valves require establishment of an initial current before the valve begins to respond to a control signal. The need for an initial current shifts the valve response curve to the right in FIG. 5, as shown by the dashed line representing the response of a typical prior art valve. The initial current required by the prior art valve to overcome the fluid momentum force $F_1$ is shown in FIG. 5 as $I_i$. The need to provide an initial current introduces a response lag into the prior art power steering system 10. As described above, in the present invention, the pressure difference change develops simultaneously with initiation of current flow to the solenoid coil 62. Thus, the present invention can be effectively used with analog control signals.

The present invention also includes a means for calibrating the valve 32 to produce a predetermined pressure difference for a particular current. For example, the valve 32 can be set to produce a specified pressure difference when subjected to a maximum current value. As explained above, the pressure difference across the valve 32 is proportional to the solenoid magnetic force $F_3$. It is well known in the art that the magnetic force $F_3$ developed by a solenoid is proportional to the size of the air gap 59 between the armature 58 and the solenoid core 57. Furthermore, the size of the air gap 59 can vary slightly between solenoids due to manufacturing tolerances. The size of the air gap 59 in the present invention is adjustable, allowing matching the magnetic force $F_3$ generated by the solenoid 36 to a predetermined current. The adjustment is accomplished by rotating the valve base 44 within the valve housing 40. As the valve base 44 is rotated, the valve base threads 48 cooperate with the valve housing threads 50 to axially shift the valve base 44 within the valve housing 40. The valve base 44 is shifted towards or away from the solenoid 36 depending upon whether the valve base 44 is rotated clockwise or counterclockwise. The constant flow of fluid through the valve 32 maintains an axially spaced apart relationship between the valve element 45 and the valve base 44. As the valve base 44 is axially shifted, the fluid flow causes the valve element 45 and actuator rod 55 to also shift. Since the end of the actuator rod 55 engages the armature 58, the armature will be shifted. Because the position of the iron core 57 is fixed, any axial shift of the armature 58 changes the size of the air gap 59. Changing the air gap size 59 varies the magnetic force $F_3$ exerted by the solenoid 36 upon the valve element 45, which, in turn, changes the fluid pressure difference between the inlet 41 and the outlet 42.

To calibrate the valve 32, the valve is installed in a calibration fixture (not shown). The calibration fixture includes transducers for monitoring the inlet and outlet pressures and means for rotating the valve base 44. A constant flow of hydraulic fluid having the specified rate of flow is directed through the valve. The solenoid winding 62 is supplied with the desired current and the valve base 44 rotated within the valve housing 40 to obtain the desired pressure difference between the inlet 41 and the outlet 42.

In accordance with the provisions of the patent statutes, the principle and mode of operation of this invention have been explained and illustrated in its preferred embodiment. However, it must be understood that the present invention may be practiced otherwise than as specifically explained and illustrated without departing from its spirit or scope. For example, while the present invention has been illustrated as being located in the rotary control valve discharge line 15, it will be appreciated that the valve 32 can be used at other positions. Likewise, the valve 32 can be used with other types of rotary control valves than have been described here.

What is claimed is:

1. A pressure control valve for use in a variable assist power steering system of a vehicle, the control valve comprising:

a housing having an inlet for receiving fluid and an outlet for discharging said fluid, said housing further having a fluid carrying passageway connecting said inlet and said outlet;

a valve element movable within said passageway and operable for controlling the fluid pressure difference between said inlet and said outlet within a predetermined pressure range, said valve element being subjected to a momentum force caused by fluid flow through said passageway;

a solenoid carried by said housing, said solenoid including an armature connected to and movable with said valve element, said solenoid responsive to an electric control signal for exerting a magnetic force on said armature for positioning said valve element within said passageway to achieve a selected fluid pressure difference between said inlet and said outlet, said control signal being variable from a predetermined minimum level up to a predetermined maximum level, said solenoid further including a fixed core piece, said core piece cooperating with said armature to define an air gap therebetween, said air gap being variable and said magnetic force being a function of said air gap size;

biasing means for exerting a balancing force on said valve element in opposition to said momentum force such that an initial increase in said control signal above said minimum level causes an increase in fluid pressure difference between said inlet and said outlet; and a valve base within said passageway, said valve base having an adjustable position within said passageway, said valve base cooperating with said valve element to shift said armature towards or away from said core piece to adjust said air gap, and said valve base being positioned to adjust the fluid pressure difference between said inlet and said outlet to a predetermined value when said control signal is at a predetermined level.

2. A pressure control valve, as set forth in claim 1, wherein said control signal varies as a function of vehicle speed.

3. A pressure control valve, as set forth in claim 1, wherein said predetermined minimum level for said control signal is zero.

4. A pressure control valve, as set forth in claim 1, wherein the magnitude of the current of said control signal is varied between said predetermined minimum and maximum levels.

5. A pressure control valve, as set forth in claim 1, wherein said biasing means includes a resilient spring engaging said armature.

6. A pressure control valve, as set forth in claim 1, wherein said initial increase in the level of said control signal causes a simultaneous increase in said fluid pressure difference.

* * * * *